United States Patent [19]

Young et al.

[11] Patent Number: 4,528,470
[45] Date of Patent: Jul. 9, 1985

[54] STARTER MOTOR INCORPORATING AN EPICYCLIC REDUCTION GEAR MECHANISM

[75] Inventors: Donald A. Young, Sutton Coldfield; Ronald Wilson, Birmingham, both of England

[73] Assignee: Lucas Industries, Birmingham, England

[21] Appl. No.: 610,561

[22] Filed: May 15, 1984

[30] Foreign Application Priority Data

May 27, 1983 [GB] United Kingdom ............... 8314793

[51] Int. Cl.$^3$ .......................... H02K 7/10; F16H 1/28
[52] U.S. Cl. .................................................... 310/78
[58] Field of Search ............ 310/83, 78, 75 D, 75 R, 310/75 A; 464/38, 37, 30; 74/7 E, 785, 801

[56] References Cited

U.S. PATENT DOCUMENTS

| | | | |
|---|---|---|---|
| 2,333,553 | 11/1943 | Potgieter et al. | 464/38 |
| 2,447,198 | 8/1948 | Miller | 310/75 D |
| 2,560,427 | 7/1951 | Foss | 464/38 |
| 3,557,574 | 1/1971 | Avery | 464/38 |
| 4,062,203 | 12/1977 | Leonard et al. | 464/38 |
| 4,282,776 | 8/1981 | Eller | 74/801 |
| 4,494,414 | 1/1985 | Hamano | 74/7 E |

FOREIGN PATENT DOCUMENTS 651363 3/1951 United Kingdom ................. 310/83

Primary Examiner—Peter S. Wong
Assistant Examiner—D. L. Rebsch
Attorney, Agent, or Firm—Holman & Stern

[57] ABSTRACT

A starter motor includes an electric motor, an epicyclic reduction gear mechanism driven by the electric motor, and a pinion gear wheel driven from the output member of the epicyclic reduction gear mechanism. The output member of the epicyclic gear mechanism is the planetary gear carrier of the mechanism and the annular gear of the mechanism is held against rotation relative to the frame of the starter motor by a torque limiting clutch, which slips when the annular gear is subjected to a torque in the direction opposite to that to which it is subjected during cranking of the associated engine, and in excess of a predetermined value, thereby limiting the torque to which the epicyclic gear mechanism and the remainder of the starter motor drive train is subjected.

8 Claims, 8 Drawing Figures

STARTER MOTOR INCORPORATING AN EPICYCLIC REDUCTION GEAR MECHANISM

BACKGROUND OF THE INVENTION

1. Field of the Invention

This invention relates to starter motors, particularly for internal combustion engines, of the kind where the rotor of the electric motor of the starter motor drives the pinion gear wheel of the starter motor through the intermediary of an epicyclic reduction gear mechanism.

2. Description of the Prior Art

Electric starter motors for internal combustion engines incorporating an epicyclic reduction gear mechanism between the electric motor and the pinion gear wheel are known. It is also known to provide the pinion gear wheel with an overrun arrangement so that the pinion gear wheel can overrun the output shaft of the epicyclic gear mechanism, for example, when the engine being started fires and drives the pinion at a speed in excess of the epicyclic reduction gear output shaft. However, a serious problem is exhibited in the known starter motor in the event that the engine being started backfires or backrocks. In such a situation the pinion gear wheel is driven by the engine in the direction opposite to that in which it is driven by its own electric motor. Thus the overrun arrangement does not slip and the reverse rotation is transmitted back to the reduction gear mechanism of the starter motor. The gear ratio of the reduction gear mechanism may be 4.5 to 1 or even more, and thus there is considerable resistance to reverse rotation of the pinion gear wheel. Since the internal combustion engine when backfiring or backrocking generates a considerable amount of force, there is a severe risk of damage to the starter motor, for example, by twisting or breakage in torsion of the shaft carrying the pinion gear wheel and/or chipping and shearing of the teeth of the reduction gear mechanism.

BRIEF SUMMARY OF THE INVENTION

It is an object of the present invention to provide a starter motor of the kind where an epicyclic reduction gear mechanism transmits drive from the electric motor of the starter motor to the pinion gear wheel of the starter motor, and the aforementioned problem is minimized.

A starter motor according to the invention includes an electric motor, an epicyclic reduction gear mechanism driven by the electric motor, and a pinion gear wheel driven from the output member of the epicyclic reduction gear mechanism, the starter motor being characterized in that the output member of the epicyclic gear mechanism is the planetary gear carrier of the mechanism and the annular gear of the mechanism, is held against rotation relative to the frame of the starter motor by a torque limiting clutch which slips when the annular gear is subjected to a torque in the direction opposite to that to which it is subjected during cranking of the associated engine, and in excess of a predetermined value, thus limiting the torque to which the epicyclic gear mechanism and the remainder of the starter motor drive train is subjected.

Desirably, said torque limiting clutch comprises the annular gear of the epicyclic reduction gear mechanism and a component which is held against rotation relative to the frame of the starter motor but is capable of relative axial movement, said component being spring biased towards the annular gear of the epicyclic reduction gear mechanism, so that surfaces on said annular gear and said component are in contact.

Preferably said torque limiting clutch is a positive action clutch, and said surfaces on the annular gear and said component are mating teeth.

Preferably said mating teeth are so shaped as to permit the clutch also to limit the torque to which the mechanism is subjected in the engine cranking direction, the spring biasing of said component towards said annular gear being sufficiently strong to avoid slipping of the clutch during normal engine cranking.

Desirably, at least one flank of each tooth lies in a helical surface which is coaxial with the annular gear.

Preferably both flanks of each tooth are of the above defined shape, and the respective helical surfaces in which they lie are opposite-handed, i.e. one of the surfaces is a left-handed helical surface and the other is a right-handed helical surface.

By the term "helical surface" is meant a surface defined by moving a straight line along a helix with a straight line intersecting the axis of the helix at right angles.

BRIEF DESCRIPTION OF THE DRAWING

The invention will now be described in detail with reference to the accompanying drawings, wherein.

DETAILED DESCRIPTION

Figure 1:
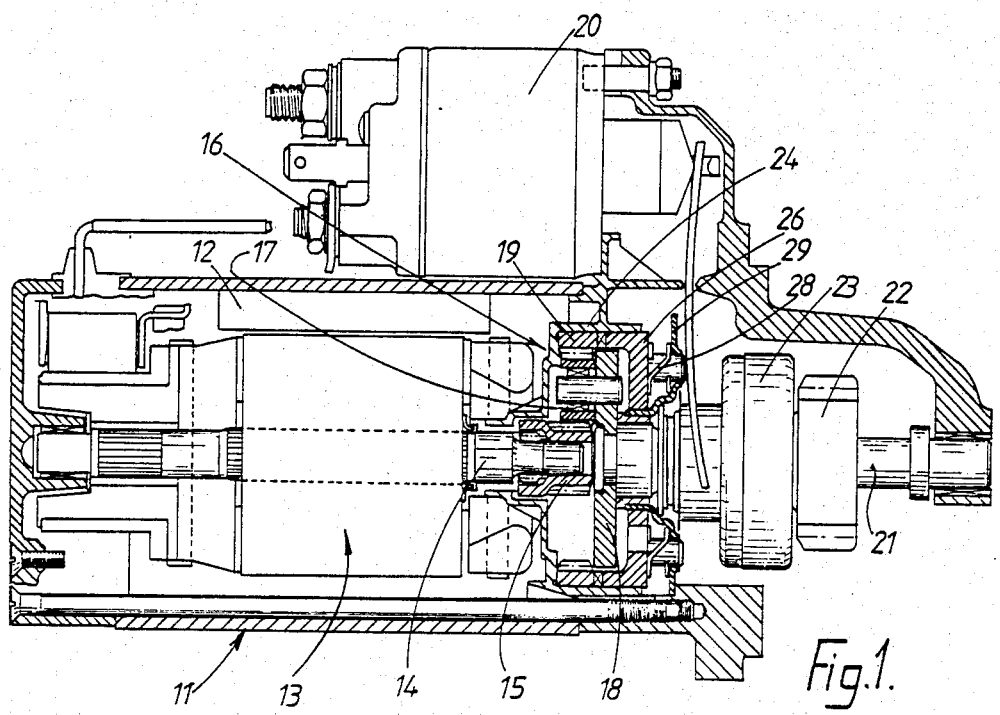
FIG. 1 is a longitudinal cross sectional view of a starter motor.

Referring to the drawings, the starter motor includes an electric motor 11 having a stator 12 and a rotor 13 which includes a rotor shaft 14. At one end the rotor shaft 14 carries a gear 15 which constitutes the input, sun gear of an epicyclic reduction gear mechanism 16. Rotatable relative to the shaft 14 about the axis of the shaft 14 is a planetary gear carrier 18 which supports three planetary gears 17 equiangularly spaced around the input gear 15 and in meshing engagement. Encircling the planet gears 17 and in meshing engagement is an outer annular gear 19. Normally the annular gear 19 is fixed against rotation, and thus as the shaft 14 rotates the planetary gear carrier 18 is caused to rotate in the same direction, but at a reduced speed. The planetary gear carrier 18 is coupled to an output shaft 21 of the starter motor so that rotation of the shaft 14 causes rotation of the shaft 21 at reduced speed. Mounted upon the shaft 21 in conventional manner is the pinion gear wheel 22 of the starter motor, the pinion gear wheel being that gear wheel which meshes with the ring gear of the internal combustion engine to be started by the starter motor. The pinion gear wheel 22 normally rotates with the shaft 21, but is driven through the intermediary of an overrun arrangement 23 of conventional form. The overrun arrangement 23 and pinion gear wheel 22 are movable from a rest position on the shaft 21 axially to an operative position by means of a solenoid 20 of conventional form. The mechanism whereby the pinion gear wheel 22 is moved between its rest and operative positions is well understood in the art, and forms no part of the present invention.

The annular gear 19 of the epicyclic gear mechanism 16 is rotatably received within a cylindrical bush 24 forming part of the frame of the starter motor. One axial face of the annular gear 19 is formed with a plurality of axially; extending teeth 25 (FIG. 3) of equilateral triangular cross-section. Also received by the bushing 24 is an annular anchor member 26 which is held by the frame of the starter motor against rotation, but which can move axially towards and away from the annular gear 19. An annular face at the axial end of the member 26 presented towards the annular gear 19 is formed with teeth 27 which can mate with the teeth 25 of the annular gear 19. The member 26 is pressed by springs 28 acting between a fixed part 29 of the starter motor frame, and the member 26, to cause the teeth 27 of the member 26 to mesh with the teeth 25 of the gear 19. The gear 19 is held against axial movement relative to the frame of the starter motor.

Thus since the member 26 is held against rotational movement then while the teeth 27 mesh with the teeth 25 the gear 19 is held immovable relative to the starter motor frame, and as will be evident from an understanding of epicyclic gear mechanisms when the outer annulus is held against rotation and the input gear rotates, then the planetary gears and their carrier rotate.

During cranking of an engine to start the engine, in the event that the engine backfires or backrocks while the pinion gear wheel 22 is engaged, it wil be recognized that the pinion gear wheel 22 will be rotated in a direction opposite to the direction in which it is rotated by the motor 11 to start the engine. This reverse rotation of the pinion gear wheel 22 will be be absorbed in the overrun mechanism 23, since the overrun mechanism 23 is arranged to permit the pinion gear wheel 22 to overrun the shaft 21 in the event that the engine starts to run while the pinion gear wheel 22 is still engaged. Thus the force generated during backfiring or backrocking will be transmitted through the overrun arrangement 23 to the shaft 21 and through the shaft 21 to the planetary gear carrier 18. In the event that the annulus 19 remains stationary then the shaft 21 will be attempting to drive the input gear 15 and shaft 14. Moreover, because the gear mechanism 16 is a reduction gear mechanism then when rotation is initiated at the shaft 21, the gear mechanism will be acting as a step-up gear mechanism rather than a reduction mechanism. There will therefore be considerable resistance to rotation and thus the loading generated by backfiring or backrocking of the engine will be applied as twisting torque to the shaft 21 and as a shear force on the teeth of the gears of the epicyclic gear mechanism. It will be recognized however, that if the annular gear 19 can rotate in such circumstances, then the reverse rotation of the pinion gear wheel 22 will be absorbed by rotation of the annular gear 19 and no damage will ensue to the shaft 21 or the teeth of the gears of the epicyclic gear mechanism.

Since the member 26 is spring urged into engagement with the annular gear 19, and since the teeth 25 and 27 are of triangular cross-section, then in an engine backfire, or backrock, condition the force transmitted back to the epicyclic gear mechanism urging the annulus 19 to rotate relative to the member 26 and the frame of the starter motor will generate a camming action between the teeth 25 and the teeth 27 and when the torque applied to the annular gear 19 exceeds the loading imposed by the springs 28 the camming action between the teeth 25 and 27 will move the member 26 axially against the springs 28 sufficiently far to permit rotational movement of the gear 19 relative to the member 26 and the frame of the starter motor. Thus the annular gear 19, the member 26, the springs 28, and the part 29 of the fixed frame of the starter motor constitute a positive action torque limiting clutch. The term "positive action" in relation to the torque limiting clutch denotes a clutch in which there is meshing between teeth formations on two parts of the clutch as opposed to a frictional engagement between, for example, a pair of friction plates as would be the case in a friction clutch. Thus when rotation occurs in the clutch it can be said that the positive action clutch "ratchets" whereas a friction clutch would be said to "slip".

Figure 2:
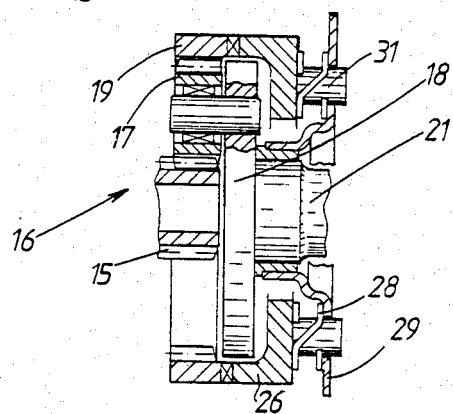
FIG. 2 is an enlarged view of part of FIG. 1.
Figure 3:
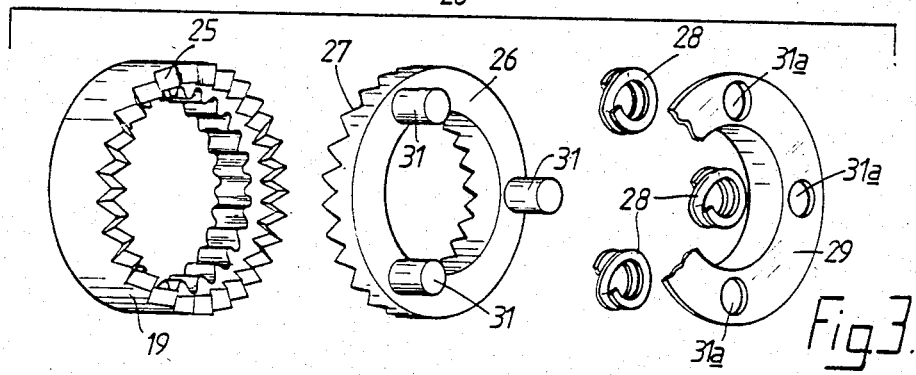
FIG. 3 is an exploded perspective view of the torque limiting clutch shown in FIG. 2.

As is evident from FIGS. 2 and 3, the member 26 incorporates three axially extending posts 31 which extend through corresponding apertures 31a in the fixed part 29 of the frame to permit axial movement of the member 26 relative to the frame, while at the same time resisting rotational movement of the member 26 relative to the frame.

Figure 4:
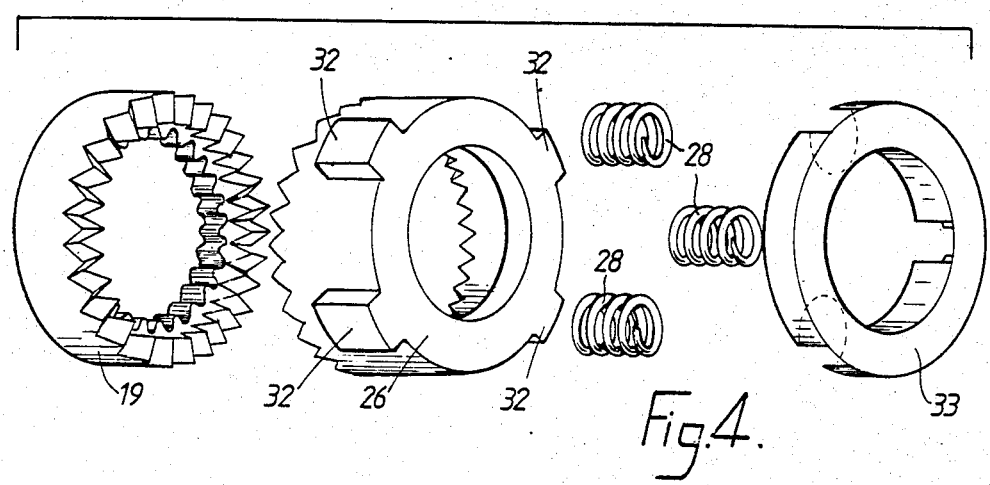
FIG. 4 is a view similar to FIG. 3 of a modification.
Figure 5:
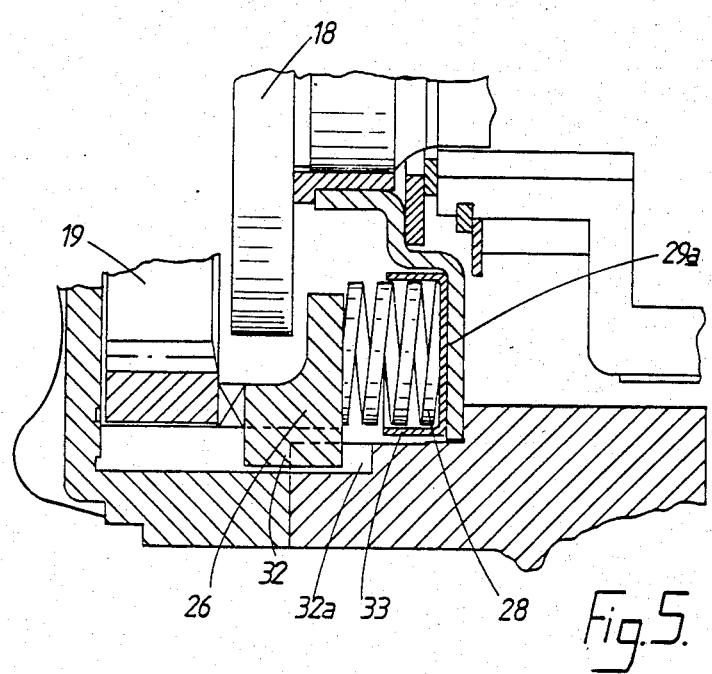
FIG. 5 is a partial cross sectional view of the modification of FIG. 4.

It will be understood that the torque limiting clutch can take a number of forms, and FIGS. 4 and 5 illustrate a modification to the arrangement shown in FIGS. 1, 2 and 3. In FIGS. 4 and 5 the annular gear 19 is unchanged, but the member 26 is provided with four axially extending lugs 32 at its periphery which replace the posts 31. The lugs 32 are received in corresponding channels 32a in a fixed part of the frame of the starter motor to prevent rotation of the member 26 while permitting axial movement. The guide member 33 constitutes an abutment for the springs 28 which urge the member 26 into engagement with the annular gear 19, the member 33 being trapped by the springs 28 against a frame part 29a equivalent to the part 29 of FIGS. 1 to 3.

Figure 6:
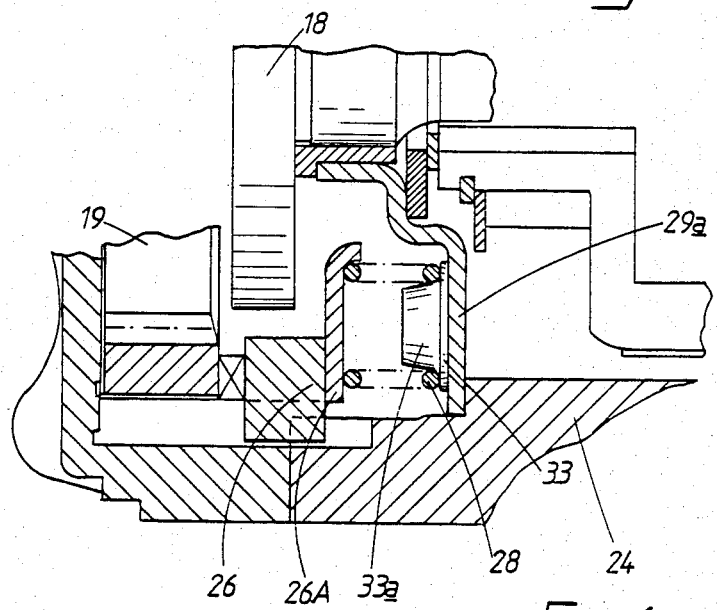
FIG. 6 is a view similar to FIG. 5 of a variant.

In the variant of the construction of FIGS. 4 and 5 as shown in FIG. 6, the guide member 33 is in the form of an annulus having upstanding from one face spring location projections 33a. Each projection 33a is received in the end of a respective spring 28 and at its opposite end each spring abuts an annular spring plate 26a which in turn abuts the member 26. Use of a spring plate 26a separate from the member 26 permits the design of the member 26 to be simplified since it no longer need accommodate engagement by the ends of the springs 28.

Figure 7:
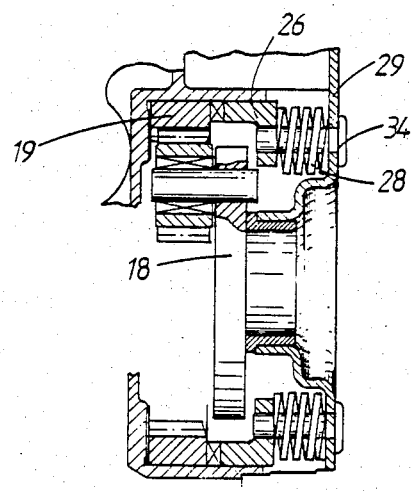
FIG. 7 is a view similar to FIG. 2 of a further modification.

In the arrangement illustrated in FIG. 7 the posts 31 of the member 26 of FIG. 3 are replaced by headed pins 34, the shanks of which pass through apertures in the frame part 29. Thus the heads of the pins 34 can engage the face of the frame part 29 remote from the member 26 and the free ends of the shanks of the pins 34 are engaged with the member 26. The springs 28 encircle the shanks of the pins 34 between the member 26 and the frame part 29.

Figure 8:
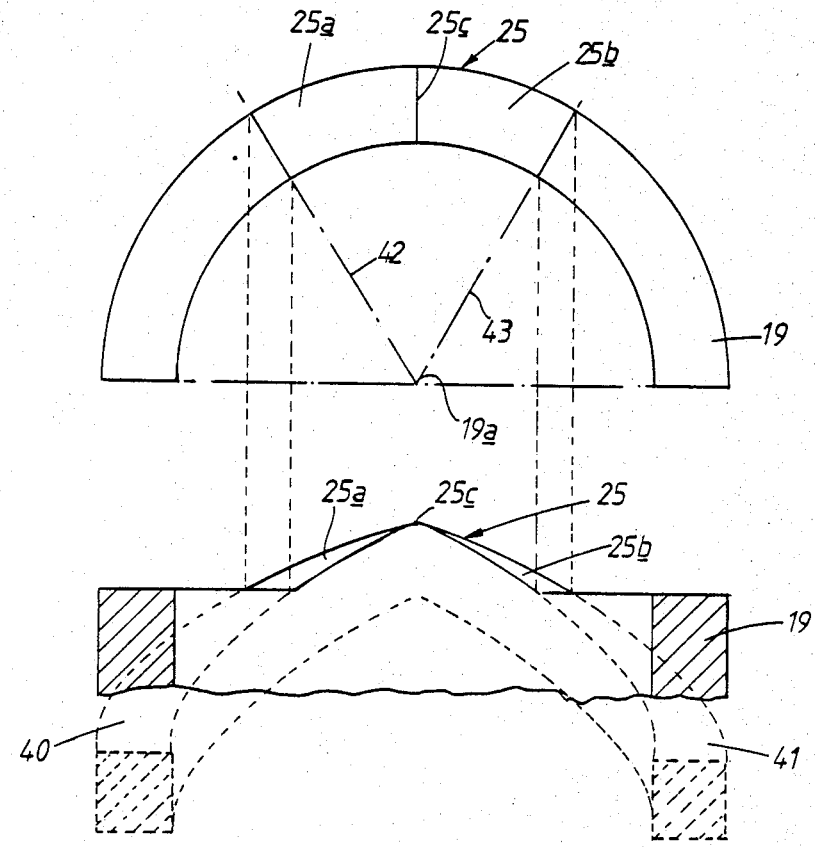
FIG. 8 is a diagrammatic representation of a practical ratchet tooth form.

For convenience the teeth 25 of the annular gear 19 an the corresponding teeth 27 of the member 26 are described above as "equilateral triangular in cross-section". While such a tooth form would function satisfactorily it is believed that it would wear rapidly and thus might give rise to variation in the torque at which the clutch "ratchets". FIG. 8 is a schematic illustration showing a more practical tooth form applicable to the teeth 25 and 27. For ease of illustration, FIG. 8 shows a single tooth on the annular gear 19, and the single tooth shown is greatly exaggerated in size, having regard to the diameter of the gear 19 as illustrated in FIG. 8.

In the upper part of FIG. 8, half of the annular gear 19 is shown in plan view, whilst in the lower part of FIG. 8, the annular gear 19 is shown in cross-section. The tooth 25 has flanks 25a and 25b which are joined at a crest 25c lying on a line extending radially from the axis 19a of the annular gear 19. The flanks 25a and 25b lie on respective helical surfaces 40 and 41 which are arranged in the opposite sense so that, as viewed in the upper part of FIG. 8, the helical surface 40 is left-handed whilst the helical surface 41 is right-handed.

The helical surface 40 is defined by moving a straight line 42 along a helix with the straight line always intersecting the axis of the helix at right angles, the helix being coaxial with the annular gear 19. Similarly, the helical surface 41 is defined by moving a straight line 43 along a helix with the straight line always intersecting the axis of the helix at right angles, and the helix being coaxial with the annular gear 19. The above two mentioned helices are arranged in the opposite sense.

Each of the other teeth (not shown) on the annular gear 19 has similarly designed flanks as do the teeth on the annular anchor member 26. The pitch of helices of the teeth determines, in conjunction with the strength of the springs 28, the torque at which the clutch "ratchets" and thus the pitch will be determined in relation to the intended torque at which the clutch is to "ratchet" in use.

The above described tooth form is applicable to any of the embodiments described above.

With the tooth form described with reference to FIG. 8, it has been found that the low wear characteristics in service are such that the torque at which the clutch "ratchets" is more consistent than with the equilateral triangular tooth form described above.

In a typical arrangement the annular gear 19 will have an external diameter of 58 mm and will carry twenty four teeth 25 each having an inclined angle of 90°. These numerical parameters can however be varied to suit different applications.

In each of the arrangements described above the teeth 25, 27 of the positive action clutch are such that the clutch can ratchet in either direction. It follows therefore that the reduction gear mechanism and the shaft 21 are protected against excessive torque in the engine cranking direction, in addition to the backfire or backrock direction. The springs 28 are sufficiently strong to ensure that the clutch will not ratchet during normal cranking of an engine to be started, that is to say, during normal operation of the starter motor.

It is to be recognized that, if desired, a friction clutch could be substituted for each positive action clutch described above. Thus for example the member 26 could carry an annular friction pad in place of the teeth 27, the pad engaging a plane surface of a friction pad on the annulus 19 in place of the teeth 25.

We claim:

1. In a starter motor including a housing, an electric motor, an epicyclic reduction gear mechanism within the housing driven by the electric motor and having an output member and a pinion gear wheel driven from the output member, the improvement comprising:

the output member of the epicyclic gear mechanism is a planetary gear carrier connected to the pinion gear wheel and having planetary gears rotatably mounted thereon;

an annular gear operatively engaging said planetary gears and rotatably mounted in the housing; and torque limiting clutch means for releasably restraining said annular gear against rotation relative to the housing;

so that when said annular gear is subjected to a torque in the direction opposite to that to which it is subjected during normal cranking of an associated engine, and in excess of a predetermined value, said clutch means releases said annular gear to allow said annular gear to slip thereby limiting the torque to which the epicyclic gear mechanism and remainder of the starter motor drive train is subjected.

2. A starter motor as claimed in claim 1 wherein said torque limiting clutch means comprises:

a clutch member mounted non-rotatably and axially movable with respect to the housing;

spring means to resiliently urge said clutch member axially toward said annular gear; and engageable surfaces on said annular gear and said clutch member.

3. A starter motor as claimed in claim 2 wherein said torque limiting clutch is a positive action clutch and said engageable surfaces on said annular gear and said clutch member are mating teeth.

4. A starter motor as claimed in claim 3, wherein said mating teeth are shaped to permit said clutch means to limit the torque to which the mechanism is subjected in the engine cranking direction, and said spring means is sufficiently strong to prevent slipping of the clutch during normal ending cranking.

5. A starter motor as claimed in claim 3, wherein at least one flank of each tooth lies in a helical surface which is coaxial with the respective member carrying the tooth.

6. A starter motor as claimed in claim 5, wherein both flanks of each tooth lie in a helical surface which is coaxial with the respective member carrying the tooth, and the respective helical surfaces in which they lie are opposite-handed.

7. A starter motor as claimed in claim 4, wherein at least one flank of each tooth lies in a helical surface which is coaxial with the respective member carrying the tooth.

8. A starter motor as claimed in claim 7, wherein both flanks of each tooth lie in a helical surface which is coaxial with the respective member carrying the tooth, and the respective helical surfaces in which they lie are opposite-handed.

* * * * *